United States Patent
Henttonen et al.

(10) Patent No.: US 7,706,797 B2
(45) Date of Patent: Apr. 27, 2010

(54) METHOD FOR INTER-SYSTEM INTER-MSC HANDOVER TO UMA

(75) Inventors: Jari Henttonen, Riihimäki (FI); Juha Kallio, Vantaa (FI); Janne Muhonen, Helsinki (FI); Armi Mensio, Vantaa (FI); Juha P. Lindfors, Vantaa (FI); Juha Oravainen, Helsinki (FI); Mika Nevander, Vantaa (FI)

(73) Assignee: Nokia Corporation, Espoo (FI)

( * ) Notice: Subject to any disclaimer, the term of this patent is extended or adjusted under 35 U.S.C. 154(b) by 348 days.

(21) Appl. No.: 11/260,628

(22) Filed: Oct. 28, 2005

(65) Prior Publication Data

US 2007/0004412 A1 Jan. 4, 2007

(51) Int. Cl.
*H04W 36/00* (2006.01)
*H04W 4/00* (2006.01)

(52) U.S. Cl. .................. 455/436; 455/438; 455/442; 370/331; 370/328

(58) Field of Classification Search .......... 370/328.331; 455/403.405, 406, 408, 426.1, 436, 438, 455/442
See application file for complete search history.

(56) References Cited

U.S. PATENT DOCUMENTS

| | | | |
|---|---|---|---|
| 5,784,442 A * | 7/1998 | Foti | 455/405 |
| 6,353,607 B1 * | 3/2002 | Valentine et al. | 370/349 |
| 6,650,899 B1 * | 11/2003 | Stumpert | 455/436 |
| 7,349,698 B2 * | 3/2008 | Gallagher et al. | 455/435.2 |
| 2003/0176186 A1 | 9/2003 | Mohammed | |
| 2004/0125770 A1 | 7/2004 | Pitt et al. | |
| 2004/0146021 A1 | 7/2004 | Fors et al. | |
| 2004/0156329 A1 * | 8/2004 | Bck et al. | 370/328 |

(Continued)

FOREIGN PATENT DOCUMENTS

| | | |
|---|---|---|
| EP | 1102511 | 5/2001 |
| WO | WO 02/067617 | 8/2002 |

OTHER PUBLICATIONS

3GPP TS 23.009 V6.0.0., "3rd Generation Partnership Project; Technical Specification Group Core Network; Handover Procedures (Release 6)", Dec. 2004, pp. 1-274.

3GPP TS 48.008 V7.0.0, 3rd Generation Partnership Project; Technical Specification Group GSM/EDGE Radio Access Network; Mobile Switching Centre—Base Station System (MSC)-BSS) Interface; Layer 3 Specification (Release 7), Apr. 2005, pp. 1-153.

(Continued)

*Primary Examiner*—Lester Kincaid
*Assistant Examiner*—Nathan Mitchell
(74) *Attorney, Agent, or Firm*—Alston & Bird LLP (57) ABSTRACT

Disclosed is a method of executing a handover in a system including a core network comprising two mobile services switching center. Both mobile services switching center can be accessed to by a cellular access as well as by a non-cellular access. The system further includes a terminal which can access to both mobile services switching center over the cellular access as well as over the non-cellular access. The method comprises the steps of handing over a call of the terminal to non-cellular access involving also a handover from a first one of said two mobile services switching center to a second one of said two mobile services switching center, and indicating in a message that the call of the terminal was handed over to non-cellular access, wherein said message is sent from the second mobile services switching center to the first mobile services switching center.

18 Claims, 6 Drawing Sheets

U.S. PATENT DOCUMENTS

2005/0060411 A1* 3/2005 Coulombe et al. .......... 709/227
2005/0208972 A1* 9/2005 Vainola et al. .............. 455/560
2006/0116127 A1* 6/2006 Wilhoite et al. ............. 455/442
2007/0264996 A1* 11/2007 Vikberg ................... 455/426.1

OTHER PUBLICATIONS

3GPP TS 29.002 V6.9.0., "*3rd Generation Partnership Project; Technical Specification Group Core Network; Mobile Application Part (MAP) Specification; (Release 6)*", Mar. 2005, pp. 1-1270.

3GPP TS 29.010 V6.5.0, "*3rd Generation Partnership Project; Technical Specification Group Core Network; Information Element Mapping Between Mobile Station—Base Station System (MS-BSS) and Base Station System—Mobile Services Switching Centre (BSS-MSC); Signalling Procedures and the Mobile Application Part (MAP) (Release)*".

International Search Report, for International Application No. PCT/IB2006/051986.

3GPP TS 29.060 V5.14.0; *3rd Generation Partnership Project; Technical Specifcation Group Core Network; General Packet Radio Service (GPRS); GPRS Tunnelling Protocol (GTP) Across the Gn and Gp Interface (Release 5)*; Sep. 2005.

3GPP TS 29.060 V6.10.0; *3rd Generation Partnership Project; Technical Specification Group Core Network and Terminals; General Packet Radio Service (GPRS); GPRS Tunnelling Protocol (GTP) Across the Gn and Gp Interface (Release 6)* Sep. 2005.

The Written Opinion for PCT Application No. PCT/IB2006/051986; Filed Jun. 20, 2006.

* cited by examiner

METHOD FOR INTER-SYSTEM INTER-MSC HANDOVER TO UMA

FIELD OF THE INVENTION

The present invention relates to a method and system concerning handover between two access technologies, in particular to handover where also the serving element in the core network is changing.

RELATED BACKGROUND ART

Unlicensed Mobile Access (UMA) technology provides access to GSM and GPRS mobile services over unlicensed spectrum technologies, including Bluetooth and IEEE 802.11 (WLAN—Wireless Local Area Network). UMA technology allows service providers to enable subscribers to roam and handover between cellular networks and public and private unlicensed wireless networks using dual-mode mobile handsets.

Figure 1:
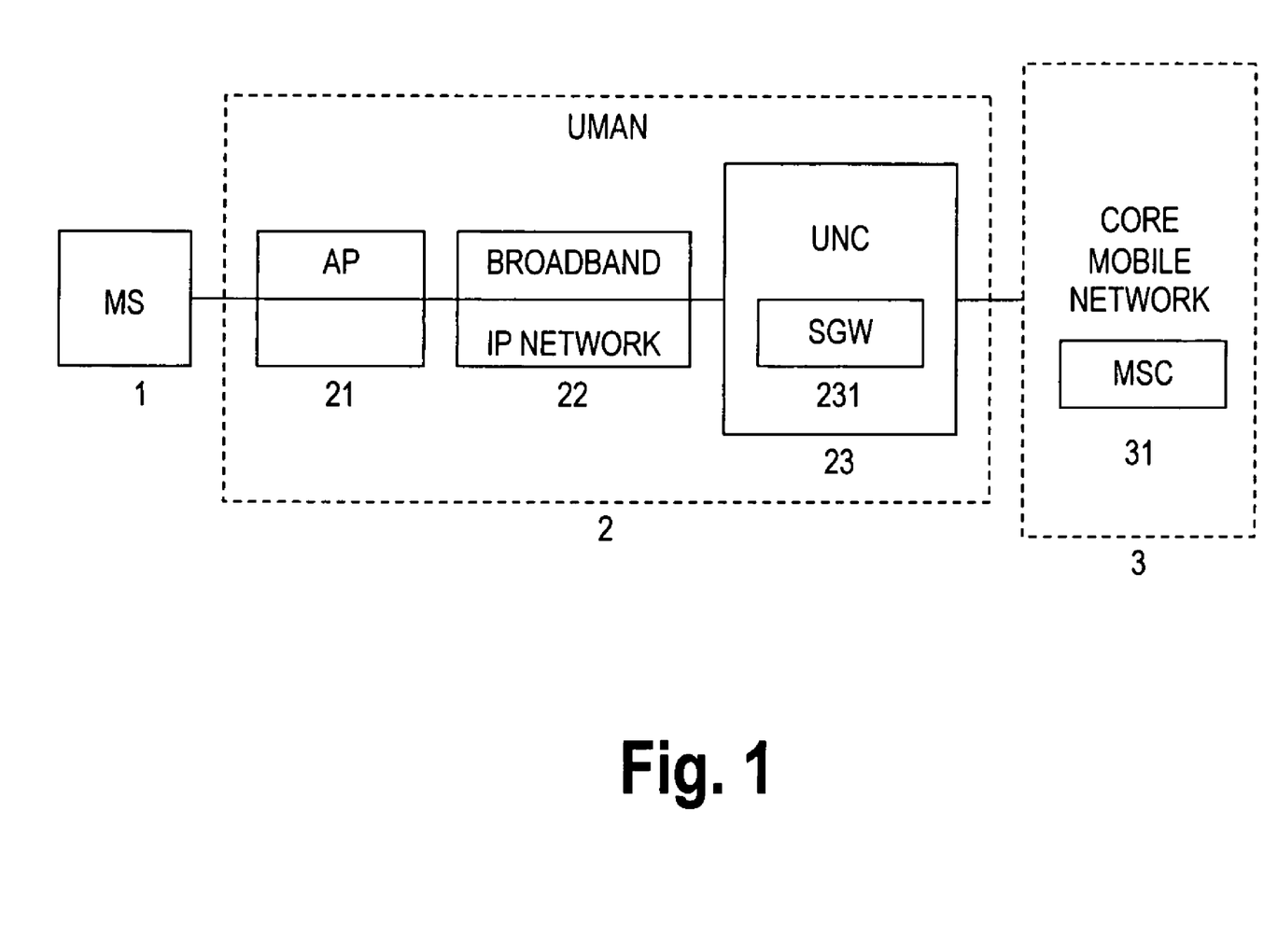
FIG. 1 shows the basic architecture of unlicensed mobile access (UMA)

In the following, the basic architecture of UMA is described by referring to FIG. 1. As illustrated, a terminal, e.g. a mobile station MS 1, obtains access to a core mobile network 3 via an Unlicensed Mobile Access Network (UMAN) 2. In detail, the mobile station 1 is connected to an Access Point (AP) 21, for example via Bluetooth or Wireless Local Area Network (WLAN, IEEE 802.11), as described above. A connection between the AP 21 and an UMA network controller (UNC) 23 is provided via a broadband Internet Protocol (IP) network 22. It is noted that the specific UMA features basically apply only for the MS 1 and the UNC 23 so that for the AP 21 any generic AP may be used.

The UNC provides functions which are basically equivalent to that of a Radio Access Network (RAN) Base Station Controller (BSC). The UNC interfaces into the mobile core network via existing A/Gb interfaces. The same mobile identity and cell identities (Cell ID) are used in both cellular RAN and in UMAN networks. A Security Gateway (SGW) 231 may be integrated in the UNC. The SGW terminates secure remote access tunnels from the MS, providing mutual authentication, encryption and data integrity for signaling, voice and data traffic.

Once a UMA capable dual mode terminal is registered to the UNC, from that point on all mobile voice and data traffic is routed to the terminal via the UMAN rather than the cellular radio access network (RAN). If the terminal has an active GSM voice call or GPRS data session when the terminal come within range (or out of range) of an unlicensed wireless network, that voice call or data session can automatically handover between access networks without interrupting the service.

As mentioned before, the UMAN network basically replaces the cellular RAN from the mobile core network point of view. A Mobile Services Switching Center (MSC) in the mobile core network sees a UNC as one of the BSCs and is able to use the same interface, i.e. the A interface, to communicate with UNCs and BSCs. Further, since the same GSM identity and GSM Cell ID are used in UMAN, the MSC is not able to distinguish, whether the current access technology is UMA or GSM, based on only the information exchanged over the A interface.

Handover between two access technologies are often called intersystem handover (ISHO). An example of a known intersystem handover is a handover between GSM and Universal Mobile Telecommunications System (UMTS). Handover between GSM and UMA can also be seen as intersystem handover.

Figure 2:
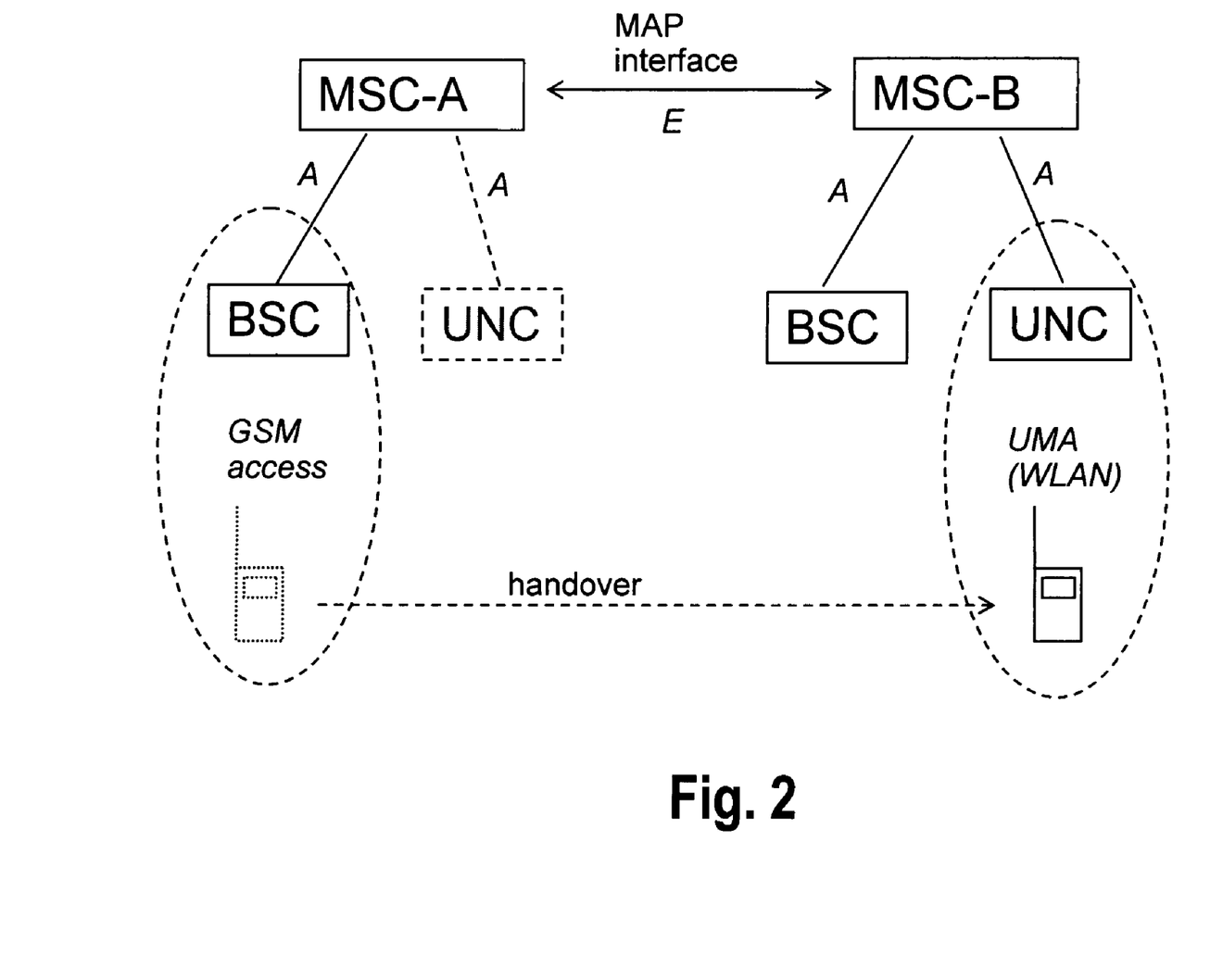
FIG. 2 shows an intersystem inter-MSC handover from GSM based access to unlicensed mobile access (UMA)

When a mobile terminal performs a handover from GSM to UMA, it may happen that the UNC that is controlling the target/entered UMAN is connected to a different MSC (MSC-B) than the BSC that controlled the cellular RAN. In this case, the handover is called intersystem inter-MSC handover, because also the serving element (MSC) to which the BSC/UNC is connected in the mobile core network is changing. FIG. 2 illustrates an intersystem inter-MSC handover from GSM to UMA. Even though MSC-A does not directly interface a new BSC/UNC after the handover, MSC-A still remains involved in the call control. For example, mobility management and charging are still performed in MSC-A, and the active call may be handed over back to MSC-A.

Relevant interfaces between the network elements are also shown in FIG. 2. Both BSC and UNC connect an MSC using the A-interface of the GSM standard. Between two MSCs, an E-interface of the GSM standard is provided.

For charging and statistics it would be beneficial if MSC-A could know the current access technology in use. However, when an (intersystem) inter-MSC handover occurs from MSC-A to MSC-B (see “handover 1” illustrated in FIG. 3), MSC-A has no means to detect the access technology to which the handover was made. It may also happen that after a normal inter-MSC handover (from GSM based access to GSM based access, see “handover 2” illustrated in FIG. 3) from MSC-A to MSC-B, an MSC-B internal handover from GSM based access to UMA is made (see “handover 3” illustrated in FIG. 3). It is apparent that also quite a number of MSC-B internal handover may take place, wherein the above problem occurs every time, a not recognized change in the access technology happens.

Regarding the above mentioned known intersystem handover between GSM and Universal Mobile Telecommunications System (UMTS), it is to be noted that no solution to the above problem can be learned therefrom, here.

In (inter-BSC and inter-MSC) handover procedures, a mobile terminal measures and periodically reports to a base station (BS) the signal quality of the current and neighboring cells. The BS forwards the information to the BSC. If the BSC determines that the signal quality of the current cell is not good enough and a neighboring cell offering better signal quality is available, the BSC requests a handover. The BSC sends to the MSC a handover message including a list of neighboring cells to which the handover is possible to perform. The MSC manages the handover and chooses the destination cell taking into account also capacity and other requirements which the BSC was not able to consider. In an inter-BSC handover the MSC contacts a new BSC, and, in an inter-MSC handover also the MSC changes and the MSC (MSC-A) must contact another MSC (MSC-B) to assist in the handover.

If a mobile terminal supports multiple radio access technologies, for example GSM and UMTS, also an intersystem handover is possible, as described above. The difference to above described handover procedures is that the mobile terminal has to measure and report the signal quality of cells belonging to different radio access technologies. The decision to request a handover is made in the RAN. If a handover is to be requested, a handover target cell is identified differently in GSM and UMTS technologies. In UMTS, the handover target cell is identified using Service Area Identity (SAI), which includes Service Area Code (SAC). SAC uniquely identifies a service area within a location area in UMTS networks. In GSM, the handover target cell is identified using GSM Cell ID. Therefore, an MSC is always able to conclude, based on the identity of the handover target cell, whether the handover is to be performed to GSM or UMTS.

However, as described before, in UMA the same GSM Cell ID is used for identification in UMA. Hence, an MSC cannot determine from the handover target cell identity whether the handover is to be performed to GSM or UMA.

As indicated in FIG. 2, with respect to the GSM handover on the protocol level, the Mobile Application Part (MAP) is used for signaling between the mobile services switching centers (MSC) and registers in the mobile core network. For example, the E-interface uses MAP for signaling (see FIG. 3). MAP is used for location updates, call control of incoming calls to a mobile station, and transmission of short messages. MAP is not a protocol by itself, but a set of non-call-related signaling protocols.

The Base Station System Application Part (BSSAP) is a protocol that supports message communication between the mobile services switching center (MSC) and base station system (BSS) in A-interface. BSSAP consists of a base station management application part (BSSMAP) and a direct transfer application part (DTAP). In inter-MSC handover, BSSAP messages are encapsulated in MAP messages for transmitting handover related information between the BSSs of MSC-A and MSC-B.

BSSMAP is an application part which supports all procedures between a mobile services switching center (MSC) and base station system (BSS) that require interpretation and processing of information related to single calls and resource management. DTAP is a user part which transmits messages transparent as regards the base station system (BSS) between a mobile station (MS) and MSC. DTAP information is not interpreted by the BSS.

Referring again to FIG. 3, when a mobile station (MS) is handed over between two MSCs, the establishment of a connection between the MSCs requires interworking between A-interface and E-interface. The handover procedure is normally triggered by BSS-A by sending a HANDOVER_REQUIRED BSSMAP message on A-interface to MSC-A. The invocation of the basic inter-MSC handover procedure is performed and controlled by MSC-A. The sending of the MAP_Prepare-Handover request to MSC-B is triggered in MSC-A upon receipt of the HANDOVER_REQUIRED BSSMAP message from BSS-A. For compatibility reason, the cell identity of the cell where the call is to be handed over in MSC-B area, provided in the HANDOVER_REQUIRED BSSMAP message, is mapped into targetCellId MAP parameter and the HANDOVER_REQUEST BSSMAP message is encapsulated in Access Network Application Protocol Data Unit (AN-APDU) MAP parameter of the MAP_Prepare-Handover request. MSC-B informs BSS-B about the requested handover by sending HANDOVER_REQUEST BSSMAP message. MSC-B, after receiving an acknowledgment from BSS-B, responds to MSC-A with a MAP_Prepare-Handover response after which MSC-A orders the handover to be performed by sending a HANDOVER_COMMAND BSSMAP message to BSS-A.

If an MSC-B internal handover is performed later, MSC-B sends MAP_PROCESS_ACCESS_SIGNALLING request to MSC-A to pass handover related information received on A-interface of MSC-B. MAP_PROCESS_ACCESS_SIGNALLING request includes HANDOVER_PERFORMED BSSMAP message.

SUMMARY OF THE INVENTION

It is an object of the present invention to overcome the short comings of the prior art.

According to a first aspect of the present invention, there is provided a method of executing a handover in a system including a core network comprising two mobile services switching center, wherein both can be accessed to by a cellular access as well as by a non-cellular access, and further including a terminal which can access to both mobile services switching center over the cellular access as well as over the non-cellular access, the method comprising: handing over a call of the terminal to non-cellular access involving also a handover from a first one of said two mobile services switching center to a second one of said two mobile services switching center; and indicating in a message that the call of the terminal was handed over to non-cellular access, wherein said message is sent from the second mobile services switching center to the first mobile services switching center.

Advantageous modifications according to the first aspect are as follows.

Said non-cellular access is unlicensed mobile access, and both said cellular access as well as said non-cellular access are based on either one of GSM or CDMA protocols.

The method further comprises charging the call by the first mobile services switching center based on an indication in the message; and establishing statistics by the first mobile services switching center based on an indication in the message.

The message is sent as a response to a request for handover of the first mobile services switching center to the second mobile services switching center.

The message is sent as a response to an information received by the second mobile services switching center that a handover of the call of the terminal to unlicensed mobile access has been performed.

The indicating step includes determining a handover to said non-cellular access by said second mobile services switching center based on configuration data and/or parameters of said non-cellular access, and wherein the result of said determining step is indicated in said message.

The handing over step includes a handover of the call of the terminal from cellular access to the second mobile services switching center to non-cellular access to the second mobile services switching center.

The message is the mobile application part interface message MAP_Prepare_Handover_Response which includes a parameter added to this message which reaches a value "true" for a handover to non-cellular access.

The message is the mobile application part interface message MAP_Process_Access_Signalling which includes a parameter added to this message which reaches a value "true" for a handover to non-cellular access.

The indicating step also includes to indicate an IP address and an IP port number of the terminal having non-cellular access after the handover.

The indicating step also includes to indicate an IP address and an IP port number of the terminal having non-cellular access after the handover, and the mobile application part interface message includes a parameter stating the IP address and an IP version thereof and a parameter stating the IP port number.

If the call is handed over from non-cellular access, there is a further indicating step by indicating in a second message that the call of the terminal was handed over from non-cellular access, wherein said message is sent from the first mobile services switching center to the second mobile services switching center.

The core network further comprises a third mobile services switching center which can be accessed to by the terminal over the cellular access and/or over the non-cellular access, and the method further comprises handing over the call of the terminal from non-cellular access involving also a handover from the second one of said two mobile services switching center to the third one; and indicating in a message that the call of the terminal was handed over from non-cellular access, wherein said message is sent from the first mobile services switching center to the third mobile services switching center.

According to a second aspect of the present invention, there is provided a method of executing a handover in a system including a core network comprising two serving GPRS support nodes, wherein both provide either one of second generation mobile network access or third generation mobile network access, and further including a terminal which can access to both serving GPRS support nodes over second generation mobile network access as well as over third generation mobile network access, the method comprising: handing over a connection of the terminal from a first one of the two serving GPRS support nodes to a second one of the two serving GPRS support nodes; indicating in a first message by the second serving GPRS support node which one of second generation mobile network access or third generation mobile network access it provides for the terminal, wherein the first message is sent from the second serving GPRS support node to the first serving GPRS support node; and indicating in a second message by the first serving GPRS support node which one of second generation mobile network access or third generation mobile network access it provided for the terminal, wherein the second message is sent from the first serving GPRS support node to the second serving GPRS support node.

According to a third aspect of the present invention, there is provided a system including a core network comprising two mobile services switching center, wherein both can be accessed to by a cellular access as well as by non-cellular access, and further including a terminal which can access to both mobile services switching center over the cellular access as well as over the non-cellular access, wherein the system is configured to perform any of the methods according to the first aspect.

According to a fourth aspect of the present invention, there is provided a mobile services switching center, configured to provide access technologies of a cellular access as well as of a non-cellular access for a terminal, wherein the mobile services switching center is operably connected with another mobile services switching center, and wherein the mobile services switching center is further configured to hand over a call of a terminal to non-cellular access, wherein also a handover from the other mobile services switching center to said mobile services switching center is involved; indicate in a message that the call of the terminal was handed over to non-cellular access; and send said message to the other mobile services switching center on the basis of the handover to non-cellular access.

Advantageous modifications according to the fourth aspect are as follows.

The non-cellular access is unlicensed mobile access, and both said cellular access as well as said non-cellular access are based on either one of GSM or CDMA protocols.

The mobile services switching center is further configured to send said message as a response to a request for handover of the other mobile services switching center.

The mobile services switching center is further configured to send said message as a response to an information received that a handover of the call of the terminal to unlicensed mobile access has been performed.

The mobile services switching center is further configured to determine handover to said non-cellular access based on configuration data and/or parameters of said non-cellular access, and to indicate the result of said determination in said message.

The configuration to hand over also includes that a handover of the call of the terminal from cellular access to said mobile services switching center to non-cellular access to said mobile services switching center is involved.

The mobile services switching center is further configured to indicate in another message that the call of the terminal was handed over to cellular access; and send said message to the other mobile services switching center on the basis of the handover to cellular access.

The message is the mobile application part interface message MAP_Prepare_Handover_Response which includes a parameter added to this message which reaches a value "true" for a handover to non-cellular access.

The message is the mobile application part interface message MAP_Process_Access_Signalling which includes a parameter added to this message which reaches a value "true" for a handover to non-cellular access.

The mobile services switching center is further configured to also indicate in said message an IP address and an IP port number of the terminal having non-cellular access after the handover.

The mobile services switching center is further configured to also indicate in said message an IP address and an IP port number of the terminal having non-cellular access after the handover, and the mobile application part interface message includes a parameter stating the IP address and an IP version thereof and a parameter stating the IP port number.

According to a fifth aspect of the present invention, there is provided a mobile services switching center configured to provide access technologies of a cellular access as well as of a non-cellular access for terminals, comprising handover means for performing a handover of a call of a terminal from another mobile services switching center; determining means for determining to which of said cellular access and non-cellular access the handover is performed; sending means for sending to said other mobile services switching center an indication about said access technology to which the handover is performed at least when the handover is performed to non-cellular access.

An advantageous modification of the fifth aspect of the present invention is that the determining means are configured to determine to which of said cellular access and non-cellular access a further handover is performed, which does not involve the other mobile services switching center, and said sending means are configured to send to said other mobile services switching center an indication about said access technology to which said further handover is performed at least when the handover is performed to a non-cellular access.

According to a sixth aspect of the present invention, there is provided a computer program product comprising processor implementable instruction portions for performing all the steps of a method according to the first aspect.

Advantageous modifications according to the sixth aspect are as follows.

The computer program product comprises a software medium storing said processor implementable instruction portions.

The computer program product is directly loadable into the internal memory of a computer.

According to a seventh aspect of the present invention, there is provided a signal carrying processor implementable instructions for controlling a computer to carry out all the steps of a method according to the first aspect.

According to an eighth aspect of the present invention, there is provided a mobile services switching center, configured to provide access technologies of a cellular access as well as of a non-cellular access for a terminal, wherein the mobile services switching center is operably connected with a second mobile services switching center, and wherein the mobile services switching center is further configured to hand over a call of a terminal to the second mobile services switching center; receive an indication about the access type to which said call is handed over; and store said indication.

An advantageous modification of this eighth aspect is that the mobile services switching center is further configured to provide said indication to at least one of a charging device and a statistics device comprised in said mobile services switching center.

Alternatively, the mobile services switching center according to the eighth aspect is further configured to hand over said call from the second mobile services switching center to a third mobile services switching center; check whether said indication is stored; and forward said indication to said third mobile services switching center.

It is to be noted that the above described optional features according to advantageous modifications of any of the aspect of the present invention may also be used in combined manner to form further advantageous modifications.

According to the above aspects of the present invention, the present invention meets the problem that the MSS-A (i.e. the MSC server which hands over a call) does not know whether a handover was made to UMA or GSM, or if an MSC-B internal handover from GSM to UMA occurs after an GSM inter MSC handover, while this information is needed for statistics and charging in the anchor-MSC (i.e. the MSC-A, wherein an anchor-MSC is defined as a controlling mobile services switching center (MSC) which first established a radio connection to or from a mobile station. The anchor MSC is in charge of the subscriber and the call for the lifetime of the call. It constitutes the interface between the radio system and the PSTN. The anchor MSC performs all necessary signaling functions in order to establish calls to and from mobile stations).

BRIEF DESCRIPTION OF THE DRAWINGS

Further details, effects and advantages of the present invention will be more readily understood from the following description of the preferred embodiments of the present invention which is to be taken in conjunction with the appended drawings, in which.

PREFERRED EMBODIMENTS OF THE PRESENT INVENTION

In the following, preferred embodiments according to the present invention are described with reference to particular implementation examples, where applicable. However, the present invention is not to be construed as being limited thereto. Rather, it are the appended claims which are intended to define the scope of the present invention.

The preferred embodiments of the present invention relate to the unlicensed mobile access (UMA) technology and how to implement UMA features in an architecture where an MSC or an MSC Server (MSS) is connected to UMA Network Controller (UNC).

In the current UMA specifications, there is not considered the inter-system inter-MSC/MSS handover to UMA. In case an inter-system inter-MSC/MSS handover to UMA happens, the anchor-MSC/MSS (MSC-A/MSS-A) does not know whether the inter-system handover is made to UMA or GSM. In both cases a BSSAP signaling is used in the E-interface (the interface between two MSC/MSS, see e.g. FIG. 2). Because of this, the statistics and charging in the anchor-MSC/MSS (MSC-A/MSS-A) is made for GSM and not for UMA. However, locally an MSC may be able to determine whether the current access technology is GSM or UMA, for example, due to differences in database configuration for UNCs and BSCs.

Currently, there is no possibility to differentiate the GSM and UMA calls in the anchor-MSC/MSS when an inter-system inter-MSC/MSS handover happens to UMA, and because of that, the statistics and charging is made for GSM although the handover is made to UMA.

According to one preferred embodiment of the present invention, there is provided a MAP extension, to be signaled from MSC-B to MSC-A, for indicating to which access technology the handover was made in the target MSC (MSS-B) and to inform MSC-A about an MSC-B internal inter-system handover from GSM based access to unlicensed mobile access (UMA).

That is, there is provided a new MAP level extension for telling whether the inter-system inter-MSC/MSS handover is made to UMA. For example, if the new extension exists, then the anchor-MSC/MSS knows that the handover is made to UMA. If the new extension does not exist, then the anchor-MSC/MSS knows that the handover is made to GSM.

According to another preferred embodiment of the present invention, there is also a MAP level extension for delivering the UMA terminal side IP address and IP port number from the MSC-B/MSS-B to the MSC-A/MSS-A when an inter-system inter-MSC/MSS handover is made to UMA for statistical purposes in MSC-A/MSS-A.

Figure 3:
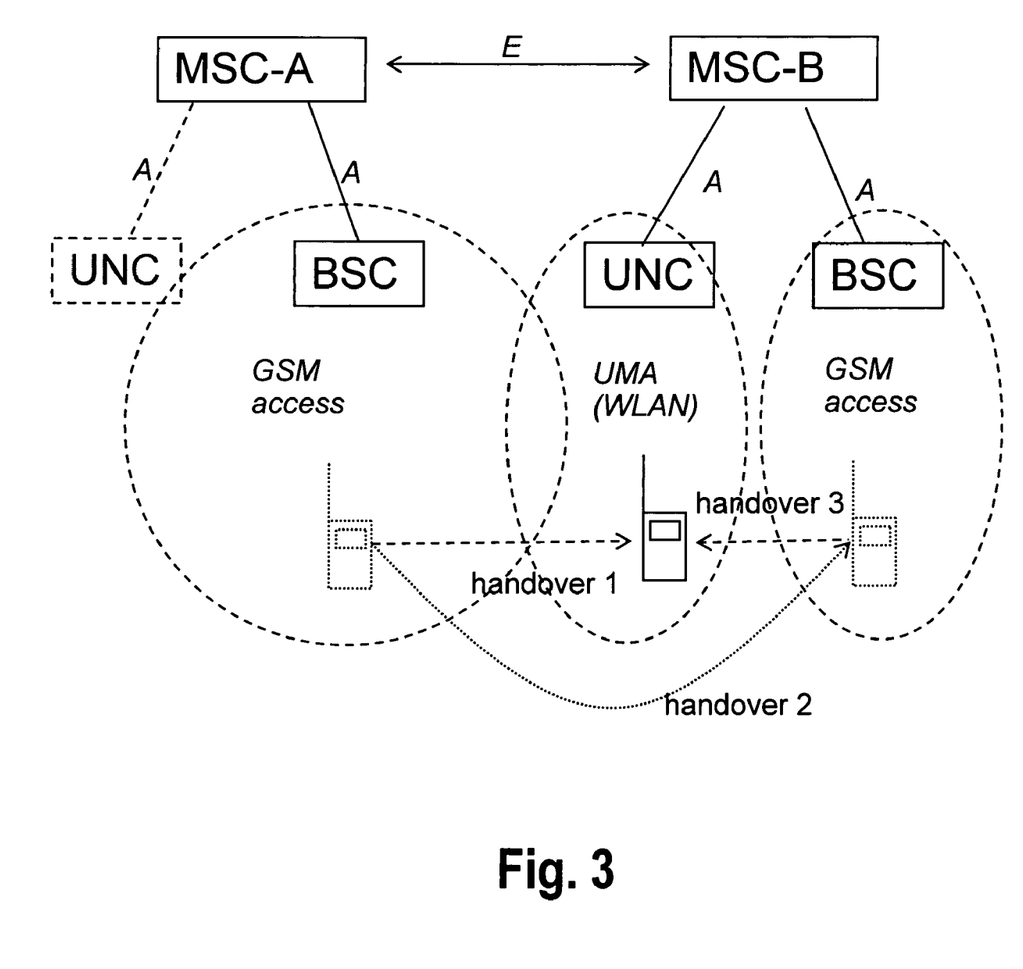
FIG. 3 shows in addition a normal inter-MSC handover from GSM based access to GSM based access from MSC-A to MSC-B, and an MSC-B internal handover from GSM based access to unlicensed mobile access (UMA)

FIG. 3 shows the use case when the terminal makes an inter-system inter-MSC/MSS handover to GSM/UMA. As can be seen in the Figure, the MSS-A cannot recognize whether the handover is made to UMA or GSM.

Figure 4:
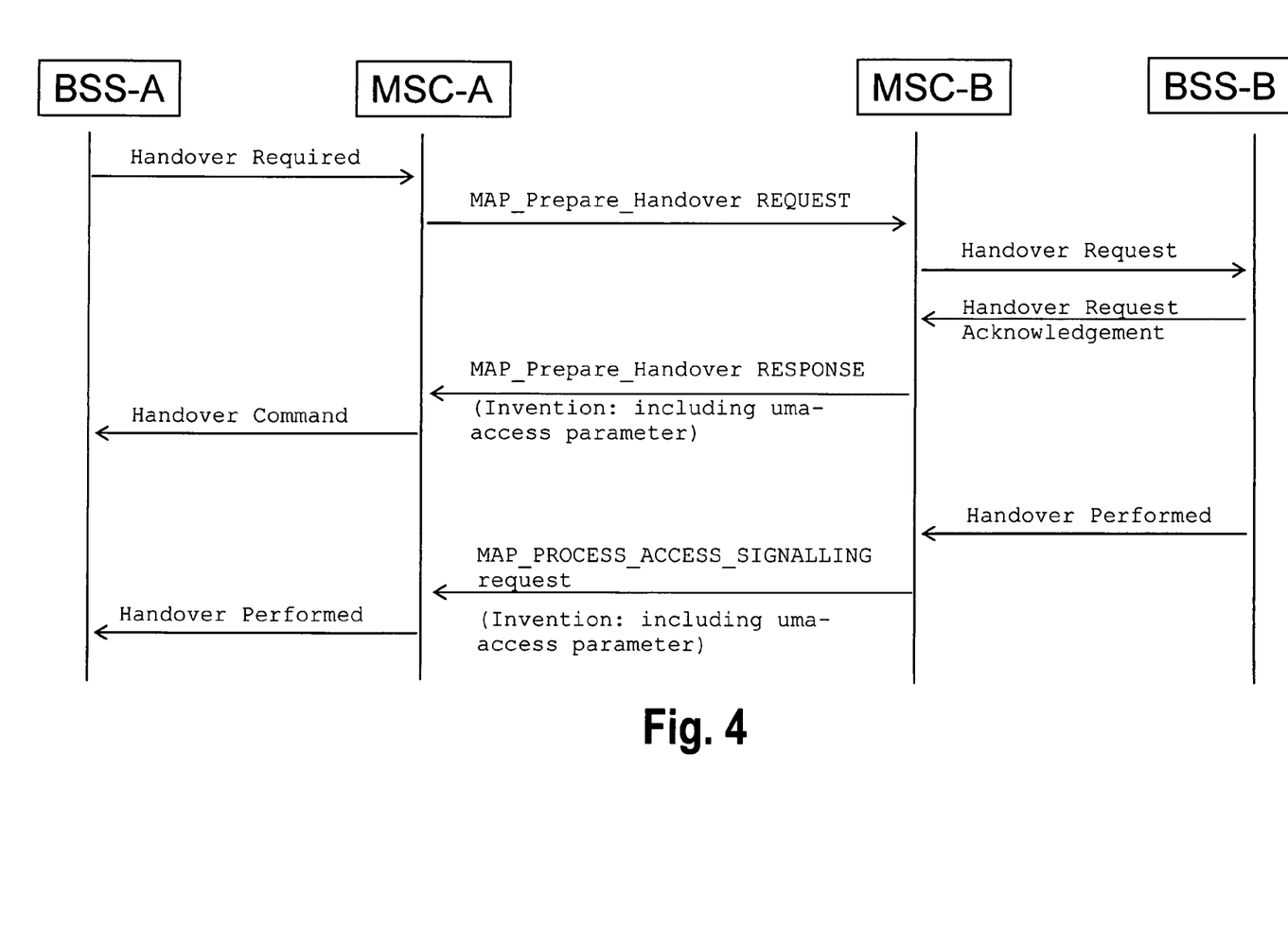
FIG. 4 shows a selected part of the handover signaling in the cases shown in FIGS. 2 and 3 which are important for understanding the present invention as well as the changes effected according to the present invention.

Accordingly, in a preferred embodiment of the present invention, new specific extensions, here called as "uma-access", "uma-ip-address" and "uma-ip-port-nb", are added for telling the anchor MSS about a UMA radio access, when inter-MSS handover to UMA is made for statistics and charging purposes and for telling the anchor-MSS about the UMA terminal side IP address and IP Port number for statistics purposes. According to the present embodiment, the following MAP interface messages are updated to include the "uma-access" parameter (see also FIG. 4):

```
PrepareHandoverRes
    (MAP_PREPARE_HANDOVER_RESPONSE)
ProcessAccessSignallingArg
    (MAP_PROCESS_ACCESS_SIGNALLING).
```

The latter MAP message is transmitted from MSS-B to MSS-A if an MSS-B internal handover occurs, meaning only after an inter-MSS handover. As stated before, the MSS-B internal handover may be an inter-system handover from GSM based access to unlicensed mobile access (UMA) which occurs later. This MAP message then includes the HANDOVER_PERFORMED message of the BSSMAP protocol.

According to a preferred embodiment, the data types prepare_ho_res_t and process_access_sign_t are updated including the following new optional parameters:

"uma-access" (Boolean, includes values "true/false")

"uma-ip_address" (ip_addr_t, includes the values "IP version" of 8 bits and "IP address" of 32 bits)

"uma-ip-port-nb" (ip_port_nb_t, includes the "IP port number" of 16 bits)

According to an implementation example of a preferred embodiment, the new specific extensions "uma-access", "uma-ip-address" and "uma-ip-port-nb" are coded by the following way:

```
HO-Ext ::= [PRIVATE 0] SEQUENCE {
    map-Opt         [0] MapOptFields    OPTIONAL,
    codec-List      [1] CodecList       OPTIONAL,
    selected-Codec  [2] SelectedCodec   OPTIONAL,
    uma-access      [3] NULL            OPTIONAL, /*NEW*/
    uma-ip-address  [4] IpAddress       OPTIONAL, /*NEW*/
    uma-ip-port-nb  [5] IPPortNb        OPTIONAL, /*NEW*/
    ...
} --$ENTRY
...
IPPortNb    ::= INTEGER (0 ... 65535)   /*NEW*/
...
```

Accordingly, the above described preferred embodiments allow that the statistics and charging functionality handled by anchor-MSC/MSS (MSC-A/MSS-A) can be different when handling GSM or UMA calls.

The present invention, when considered in its broader aspects, is presently considered to be also applicable to the recognition of an Inter System Handover (ISHO) in the mobile packet core in a serving GPRS support node (SGSN).

Currently, upon an inter-system handover, the new SGSN does not know if the old SGSN is a second generation (2G) or third generation (3G) SGSN. The ISHO works, but it cannot be seen from the statistics. It is just known that an inter SGSN routing area update (RAU) has happened.

Therefore, according to another embodiment of the present invention, a system type parameter is added to the messages between the new and old SGSN: The new SGSN adds a system type parameter to SGSN context request message and the old SGSN adds the same parameter to the SGSN context response. Thus, both ends will know if the inter SGSN RAU was an ISHO. This means a modification to the GPRS (General packet Radio Services) specification 3GPP TS 29.060. The advantage is that ISHO operation could be separated from inter SGSN RAU in statistics and the operator could use the information in network planning by trying to prevent unnecessary ISHO operations.

According to this embodiment of the present invention, there is the advantage that this clearly enhances the statistics, so that the SGSN is able to count also incoming inter-system inter-SGSN RAUs. Hence, an ISHO operation could be separated from an inter SGSN RAU in statistics. Thus, an operator could use the information in network planning by trying to prevent unnecessary ISHO operations. Another advantage is that this embodiment can be rather easily implemented with existing information elements (IE) in the Gn interface.

Still, the invention is considered to be also applicable to inter-MSC handover from UMTS (Universal Terrestrial Telecommunication System) to UMA. For example, according to still another preferred embodiment of the present invention, first an inter-MSC handover to UMTS is performed from MSC-A to MSC-B. According to the present embodiment, Radio Access Network Application Part (RANAP) messages are exchanged instead of BSSAP messages between MSC-A and MSC-B. Then, a MSC-B internal inter-system handover is performed from UMTS to GSM or UMA. RANAP remains the valid protocol between MSC-A and MSC-B also after the handover. According to the prior art, again MSC-A cannot know whether the handover was made to GSM or UMA. However, according to the present embodiment, a "uma_access=TRUE" indication similar to the above described preferred embodiments may be transmitted in RANAP messages from MSC-B to MSC-A.

Figure 5:
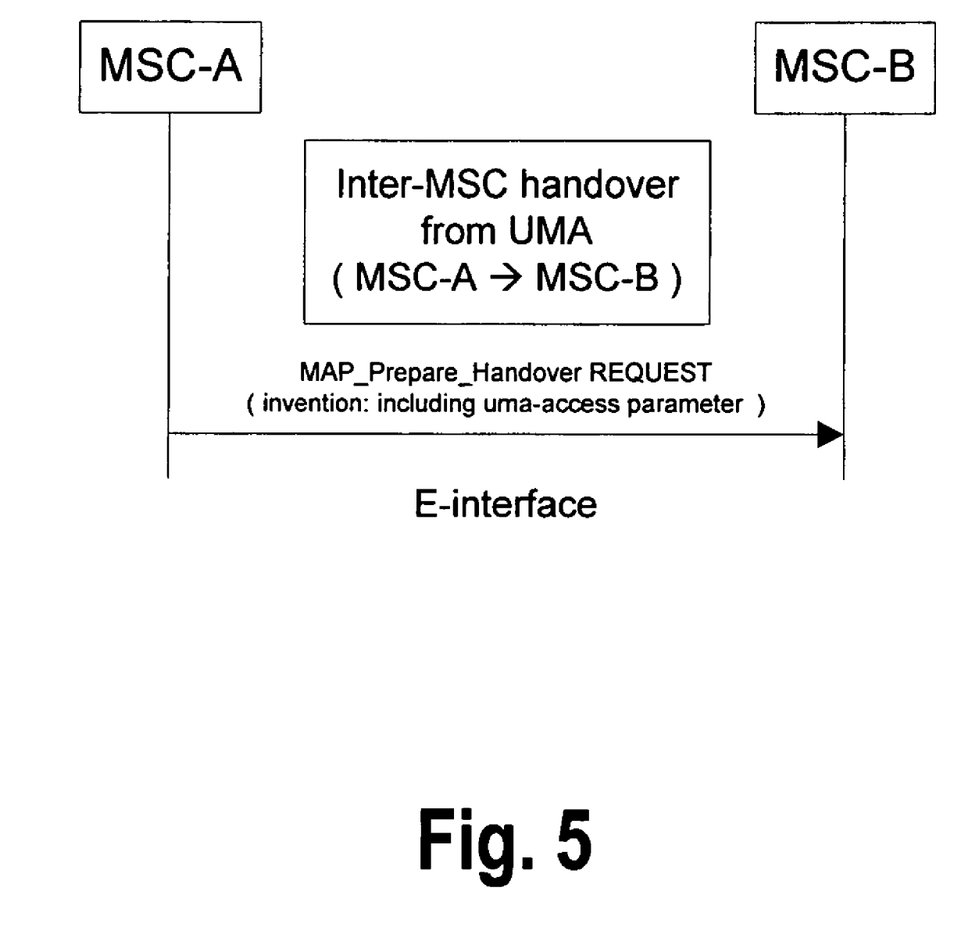
FIG. 5 shows an embodiment of the present invention where the target MSC is informed that a handover is made from UMA.
Figure 6:
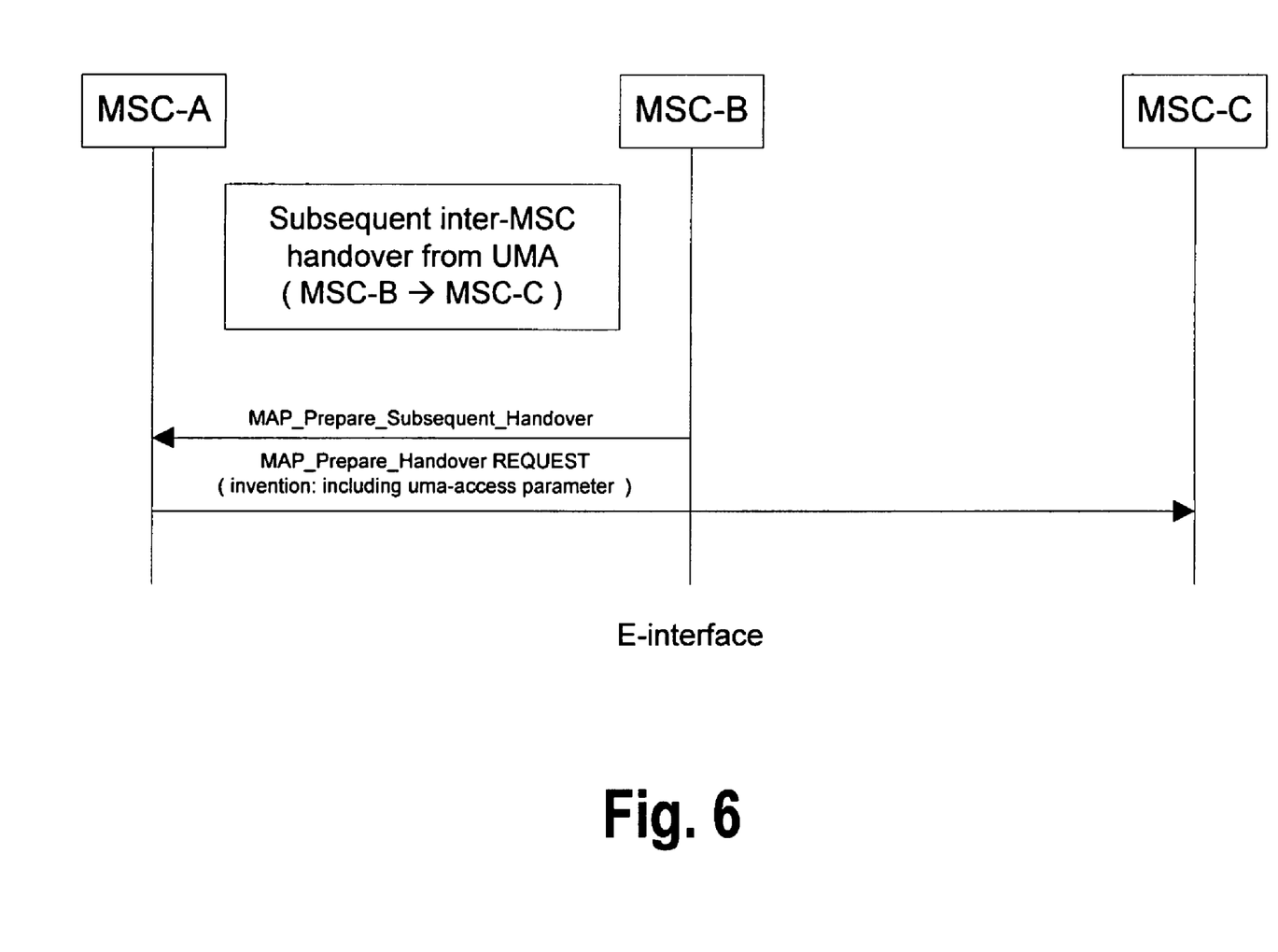
FIG. 6 shows another embodiment of the present invention where also in a subsequent inter-MSC handover the target MSC is informed by the anchor MSC that a handover is made from UMA.

According to yet another embodiment of the present invention, it is also considered e.g. for information purposes such as determining the handover types for operator's network planning or the like to inform the target MSC of the access technology used by the MSC which hands over a connection (a call). This embodiment is depicted in FIGS. 5 and 6 showing cases where a handover is made from UMA technology. That is, according to the present embodiment a target MSC is informed of the access technology used by the MSC from which a handover is made. As the present invention is considered to be advantageously applicable to UMA technology, it is illustrated in FIGS. 5 and 6 that a handover is made from UMA.

Specifically, FIG. 5 illustrates an inter-MSC handover from UMA, where the handover is effected directly from the anchor MSC/MSS (MSC-A) to a target MSC (MSC-B). Following the above description about MAP level extensions, FIG. 5 illustrates that a MAP-level UMA-extension is added to a MAP_PREPARE_HANDOVER_REQUEST message which is sent over the E interface. Thus, by providing this UMA extension, the MSC-B is told from which access technology the handover is made which is UMA, here.

On the other hand, FIG. 6 shows a case where there is a subsequent inter-MSC handover from UMA, i.e. a handover is made from MSC-B which is not the anchor MSC to another target MSC (MSC-C) which is also not the anchor MSC. This handover may e.g. follow the ones which are shown in FIGS. 2, 3 and 5, where eventually UMA access technology is provided at the target MSC, i.e. MSC-B. As shown in FIG. 6, the MSC-B sends a MAP_PREPARE_SUBSEQUENT_HANDOVER message to the anchor MSC, i.e. MSC-A. According to the present invention, the anchor MSC (MSC-A) knows about the access technology currently used at MSC-B and sends a MAP_PREPARE_HANDOVER_REQUEST message also here including the MAP-level UMA-extension. Accordingly, the target MSC (MSC-C) is informed about the access technology used at the MSC (MSC-B) which handed over which is UMA, here.

While the embodiment described above with respect to FIGS. 5 and 6 is still based on the idea that the target MSC informs the MSC which hands over about the access type used (particularly by sending a respective message if its non-cellular like e.g. UMA and by concluding from the absence of such message that its cellular, but also including the case to send another message if its cellular), the present invention is not limited thereto. If it is considered that only the MSC which hands over informs the target MSC about the used access type (including the case to only inform about non-cellular access but not being limited thereto), and omitting the information message vice versa, i.e. from the target MSC to the MSC which hands over, this forms a further embodiment of the present invention which is still linked with the above designated idea by the common concept that the statistics are beneficially enhanced e.g. for use by the operator in network planning.

Thus, what is described above is inter alia a method of executing a handover in a system including a core network comprising two mobile services switching center. Both mobile services switching center can be accessed to by a cellular access as well as by a non-cellular access. The system further includes a terminal which can access to both mobile services switching center over the cellular access as well as over the non-cellular access. The method comprises the steps of handing over a call of the terminal to non-cellular access involving also a handover from a first one of said two mobile services switching center to a second one of said two mobile services switching center, and indicating in a message that the call of the terminal was handed over to non-cellular access, wherein said message is sent from the second mobile services switching center to the first mobile services switching center.

While it is described above what are presently considered as being preferred embodiments of the present invention, it is apparent to those skilled in the art that various modifications may be made without departing from the spirit and scope of the present invention as defined in the appended claims.

The invention claimed is:

1. A method comprising:
    directing receipt, by a second mobile services switching center, of a handover request for a call from a first mobile services switching center;
    handing over the call from the first mobile services switching center to a second mobile services switching center including handing over the call from cellular access to non-cellular access, wherein the first mobile services switching center does not know whether the call is handed over to the non-cellular access; and
    after the call is handed over, directing sending of a message, in response to the received handover request, by the second mobile services switching center indicating that the call was handed over to non-cellular access;
    wherein said non-cellular access comprises unlicensed mobile access, and both said cellular access as well as said non-cellular access are based on either one of global system for mobile communications or code division multiple access protocols; and
    wherein said message comprises a mobile application part interface message MAP_Prepare_Handover_Response, and wherein said message comprises a parameter indicating handover of the call to non-cellular access.

2. The method according to claim 1, further comprising: charging the call by the first mobile services switching center based on the indication in the message; and
    establishing statistics by the first mobile services switching center based on the indication in the message.

3. The method according to claim 1, further comprising determining a handover to said non-cellular access based on configuration data and/or parameters of said non-cellular access, and indicating said configuration data and/or parameters of said non-cellular access in said first message.

4. The method according to claim 1, wherein said parameter comprises a mobile application part level extension.

5. The method according to claim 1, wherein indicating that the cell was handed over to non-cellular access also comprises indicating an internet protocol address and an internet protocol port number of a terminal having non-cellular access after the handover.

6. The method according to claim 3, wherein said indicating that the call was handed over to non-cellular access also comprises indicating an internet protocol address and an internet protocol port number of the terminal having non-cellular access after the handover, and wherein the mobile application part interface message comprises a parameter stating the internet protocol address and an internet protocol version thereof and a parameter stating the internet protocol port number.

7. An apparatus comprising at least one processor and at least one memory storing computer program code, wherein the at least one memory and stored computer program code are configured to, with the at least one processor, cause the apparatus to at least:
    provide non-cellular access;
    receive a command to control a handover of a call regardless of whether the handover is to the non-cellular access;
    hand over the call between the cellular access and the non-cellular access based on the command;
    generate a message indicating that the call was handed over to non-cellular access, wherein the at least one memory and stored computer program code are configured to, with the at least one processor, cause the apparatus to generate the message by generating a mobile application part interface message MAP_Prepare_Handover_Response comprising a parameter indicating handover of the call to non-cellular access; and
    direct sending of the message after the call is handed over, wherein said non-cellular access comprises unlicensed mobile access, and both said cellular access as well as said non-cellular access are based on either one of global system for mobile communications or code division multiple access protocols.

8. The apparatus according to claim 7, wherein the at least one memory and stored computer program code are configured to, with the at least one processor, further cause the apparatus to receive a request for handover, wherein the at least one memory and stored computer program code are configured to, with the at least one processor, further cause the apparatus to generate and send, respectively, the message as a response thereto.

9. The apparatus according to claim 7, wherein the at least one memory and stored computer program code are configured to, with the at least one processor, further cause the apparatus to receive information that a handover of the call to unlicensed mobile access has been performed, wherein the at least one memory and stored computer program code are configured to, with the at least one processor, cause the apparatus to generate and send, respectively, the message as a response thereto.

10. The apparatus according to claim 7, wherein the at least one memory and stored computer program code are configured to, with the at least one processor, further cause the apparatus to determine handover to said non-cellular access based on configuration data and/or parameters of said non-cellular access, and wherein the at least one memory and stored computer program code are configured to, with the at least one processor, further cause the apparatus to indicate said configuration data and/or parameters of said non-cellular access in said message.

11. The apparatus according to claim 7, wherein the at least one memory and stored computer program code are configured to, with the at least one processor, further cause the apparatus to:

generate another message indicating that the call was handed over to cellular access.

12. The apparatus according to claim 8, wherein said parameter comprises a mobile application part level extension.

13. The apparatus according to claim 9, wherein said message comprises the mobile application part interface message MAP Process Access_Signalling which comprises a parameter added to this message which reaches a value "true" for a handover to non-cellular access.

14. The apparatus according to claim 7, wherein the at least one memory and stored computer program code are configured to, with the at least one processor, further cause the apparatus to indicate in said message an internet protocol address and an internet protocol port number of a terminal having non-cellular access after the handover.

15. The apparatus according to claim 11, wherein the at least one memory and stored computer program code are configured to, with the at least one processor, further cause the apparatus to indicate in said message an internet protocol address and an internet protocol port number of the terminal having non-cellular access after the handover, and the mobile application part interface message comprises a parameter stating the internet protocol address and an internet protocol version thereof and a parameter stating the internet protocol port number.

16. An apparatus, comprising:
cellular access provision means for providing access technologies of cellular access;
non-cellular access provision means for providing non-cellular access;
receiving means for receiving a command to control a handover of a call regardless of whether the handover is to the non-cellular access;
handover means for performing a handover of the call between the cellular access and the non-cellular access based on the command;
generating means for generating a message indicating that the call was handed over to non-cellular access, wherein said generating means comprise generating means for generating the message by generating a mobile application part interface message MAP_Prepare_Handover_Response comprising a parameter indicating handover of the call to non-cellular access; and
transmitting means for transmitting the message after the call is handed over,
wherein said non-cellular access comprises unlicensed mobile access, and both said cellular access as well as said non-cellular access are based on either one of global system for mobile communications or code division multiple access protocols.

17. A computer program product embodied on a computer readable medium said computer program configured to control a processor to perform:
directing receipt, by a second mobile services switching center, of a handover request for a call from a first mobile services switching center;
handing over the call from the first mobile services switching center to a second mobile services switching center including handing over the call from cellular access to non-cellular access, wherein the first mobile services switching center does not know whether the call is handed over to the non-cellular access; and
after the call is handed over, directing sending of a message, in response to the received handover request, by the second mobile services switching center indicating that the call was handed over to non-cellular access,
wherein said non-cellular access comprises unlicensed mobile access, and both said cellular access as well as said non-cellular access are based on either one of global system for mobile communications or code division multiple access protocols and
wherein said message comprises a mobile application part interface message MAP_Prepare_Handover_Response, and wherein said message comprises a parameter indicating handover of the call to non-cellular access.

18. The computer program product according to claim 17, wherein said computer program is loaded into an internal memory of a computer prior to executing said program via said processor.

* * * * *